April 1, 1947.  G. F. GRUENKE  2,418,346
PREPARATION OF METALLIC HALIDE-HYDROCARBON COMPLEX CATALYST
Filed May 10, 1944
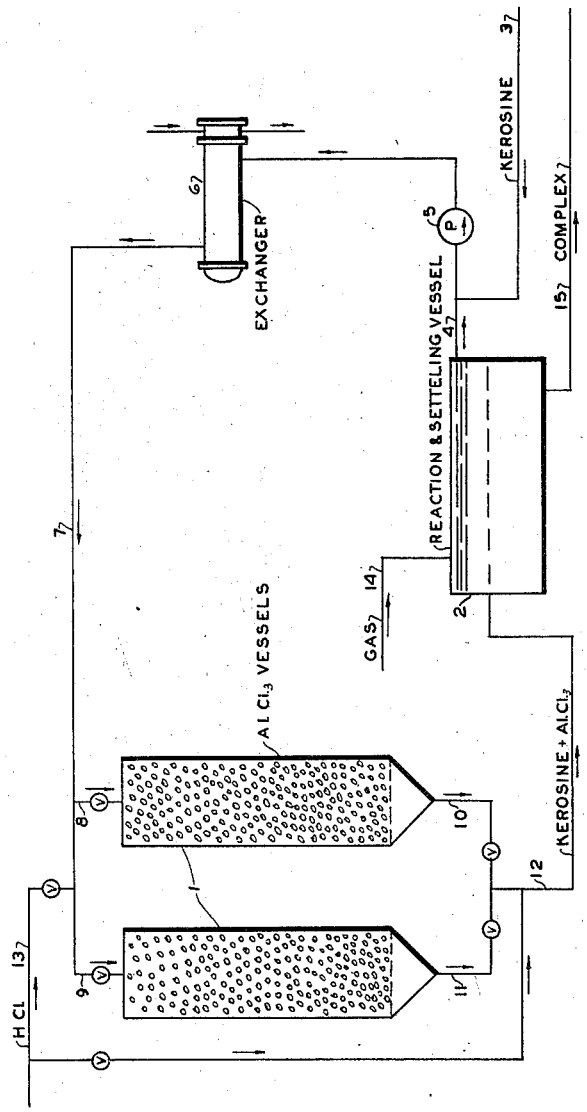
GILBERT F. GRUENKE
INVENTOR
BY
HIS ATTORNEY Patented Apr. 1, 1947

2,418,346

UNITED STATES PATENT OFFICE 2,418,346

PREPARATION OF METALLIC HALIDE-HYDROCARBON COMPLEX CATALYST

Gilbert F. Gruenke, Port Arthur, Tex., assignor to The Texas Company, New York 17, N. Y., a corporation of Delaware Application May 10, 1944, Serial No. 535,001

2 Claims. (Cl. 252—254)

The present invention relates to catalyst manufacture and particularly to a complex liquid catalyst formed by reacting a solid metallic halide such as aluminum chloride with a hydrocarbon, preferably a normally liquid hydrocarbon, in the presence of a promoter such as hydrogen halide.

Complex compounds formed by reacting a metallic halide with a petroleum hydrocarbon in the presence of a promoter are useful as catalysts for effecting catalytic conversion of hydrocarbons such as conversion processes involving alkylation and isomerization. The metallic halide may be reacted with various types of hydrocarbons including olefins, paraffins, naphthenes and aromatics. A mixture of reactant hydrocarbons may be employed, as for example, kerosine or some other fraction of petroleum.

In accordance with the invention, a hydrocarbon stream, advantageously a stream of normally liquid hydrocarbon, is passed in contact with a solid mass of metallic halide in a contact zone under conditions such that solution of some of the halide occurs. A stream of hydrocarbon containing metallic halide is continuously drawn off from the contact mass and passed to a reaction and settling zone wherein the metallic halide reacts with the hydrocarbons in the presence of a promoter to form metallic halide hydrocarbon complex. Phase separation occurs between the complex and unreacted hydrocarbons. The separated complex is retained in the settling zone or removed to another vessel if desired, while the supernatant oil phase is drawn off and recycled to the contact mass. In this way the recycled oil is maintained substantially free from complex as it returns to the contact mass.

The time during which the oil is in contact with the solid metallic halide in the contact zone is advantageously short so that the action at the surface of the metallic halide lumps is essentially one of solution and washing rather than complex formation even though some promoter is present. The small amount of complex that may be formed at this point is effectively and rapidly displaced from the metallic halide lumps by the flowing stream of liquid hydrocarbons.

Thus when preparing an aluminum chloride-kerosine complex, the kerosine is in the contact zone for a period of about 1 to 5 minutes and usually about 2 to 3 minutes. The kerosine stream passes through the contact zone at a temperature in the range 150 to 250° F. and preferably about 200° F. Under these conditions the kerosine dissolves a small amount of aluminum chloride sufficient to saturate or partly saturate it.

It is advantageous to employ conditions in the contact zone effective to reduce complex formation therein to a minimum. It is advantageous to avoid complex formation in this zone as completely as possible.

The effluent stream containing dissolved aluminum chloride is then passed to a reaction and settling zone wherein the aluminum chloride reacts with the kerosine hydrocarbons in the presence of hydrogen chloride as a promoter. The kerosine hydrocarbons and aluminum chloride remain at a temperature of about 200° F. in the reaction and settling vessel for a period of time ranging from about 30 to 60 minutes so that substantially all of the aluminum chloride present in the hydrocarbons enters into complex formation.

The make-up promoter required may be added either subsequent to, or prior to, passage of the hydrocarbons through the contact zone, although the circulating oil stream will be substantially saturated with promoter.

The complex phase being heavier than the unreacted hydrocarbons settles to the bottom of the reaction vessel and accumulates therein while the unreacted hydrocarbons form the previously mentioned supernatant oil layer which is continuously drawn off and recycled to the contact zone.

It has been known heretofore to prepare complex catalyst of the foregoing character by charging a quantity of oil, metallic halide and promoter to a vessel and subjecting the resulting mixture to heating and stirring in a batch type of operation.

The present invention involves a substantial improvement over the prior art since it provides for segregating the complex substantially as rapidly as it is formed and resuming contact between solid metallic halide and unreacted hydrocarbons in the substantial absence of complex. It avoids pumping and circulation of complex, which is advantageous from the standpoint of reducing corrosion and erosion of equipment. One difficulty experienced in pumping complex is that the complex penetrates the packing glands and solidifies, causing leakage and injury to the pump.

By segregating the complex from the solid metallic halide substantially as rapidly as it forms, more effective contact is realized between the unreacted hydrocarbons and solid metallic halide so that the operation is more efficient and economical.

In order to describe the invention, reference will now be made to the accompanying drawing.

In the drawing, the numeral 1 designates a pair of vessels packed with solid aluminum chloride. The aluminum chloride is usually in the form of particles or lumps ranging from about ¼ to ⅜" in diameter.

Two vessels are provided so that when one is on stream the other is off stream for recharging with fresh aluminum chloride.

The numeral 2 designates a reaction and settling vessel adapted to receive the effluent stream from the vessels 1.

In operation a stream of kerosine, advantageously kerosine derived from paraffin base crude and which is substantially free from olefinic and aromatic hydrocarbons, is drawn from a source not shown through a pipe 3 which communicates with a pipe 4.

The pipe 4 leads to a pump 5 which discharges to a heater 6 wherein the kerosine is heated to a temperature of about 200° F. The heated stream is discharged from the heater through a pipe 7 which communicates with branch pipes 8 and 9.

Assuming that the right-hand vessel 1 is being maintained on stream and contains solid aluminum chloride, the heated kerosine is passed through the branch pipe 8 into the vessel.

At the elevated temperature, kerosine dissolves a small amount of aluminum chloride and the effluent stream of solution is drawn off through a pipe 10 communicating with a pipe 12. A small amount of hydrogen chloride is added to promote complex formation. It is drawn from a source not shown through a pipe 13 and may be injected into the hydrocarbon stream either prior to or subsequent to passage through the vessel 1.

This effluent stream flows through the pipe 12 into the vessel 2 wherein complex formation and phase separation occurs. The complex phase settles to form a bottom layer while the unreacted hydrocarbons accumulate as a supernatant layer.

The supernatant oil is continuously withdrawn through pipe 4 and discharged by the pump 5 for recycling through the heater 6.

In practice, kerosine may be introduced through the pipe 3 at the outset so as to substantially completely fill the system. The further introduction of kerosine is stopped and the oil in the system continuously circulated until it is substantially all converted to complex. On the other hand, some complex may be removed continually or intermittently from the vessel 2 and in that case fresh kerosine may be added to the system the amount so added depending upon the amount of complex which it is desired to produce.

When the aluminum chloride is consumed in the right-hand vessel 1 the flow of hydrocarbons is then switched through the branch pipe 9 into the left-hand vessel 1 from which it is discharged through the pipe 11 into the previously mentioned pipe 12.

Thus, in accordance with the method of flow described, the kerosine or unreacted oil which is recirculated from the separator 2 is substantially free of complex so that upon reintroduction of the recycled oil into the vessels 1 effective contact is realized between the oil and the aluminum chloride.

The body of complex liquid accumulating in the vessel 2 is drawn off through a pipe 15 either to storage or to a conversion reaction zone wherein it is to be used for catalyzing a conversion reaction such as isomerization or alkylation. The complex can be forced from the vessel 2 by introduction of a gas, such as butane, under pressure through a pipe 14 from a source not indicated.

If desired, the complex may be subjected to washing for the purpose of removing small amounts of residual kerosine that may be present or for effecting removal of other catalytically inactive material that may be present. The complex may be disposed as a static column of liquid in a tower and the washing medium, as for example normal butane in liquid phase, is caused to flow upwardly through the liquid column. The butane is thus dispersed within the complex catalyst and rises therethrough by difference in density displacing the catalytically inactive material. The butane and displaced material accumulates in the top of the tower and is drawn off therefrom leaving the complex catalyst in suitable condition for use as a catalyst either in the wash tower or in some other zone of reaction as may be desired.

While specific mention has been made of forming a complex from aluminum chloride, it is contemplated that other solid metallic halides such as zirconium chloride may be used. Likewise, other hydrocarbons or hydrocarbon mixtures than kerosine may be used. However, from the standpoint of making a complex catalyst effective for isomerizing normal paraffins such as normal butane, it is desirable to employ a non-aromatic hydrocarbon.

Mention has been made of employing down flow of circulating hydrocarbon through the vessels 1. It is contemplated, however, that the direction of flow may be reversed so that the circulating stream flows upwardly through the solid contact masses and overflows from the vessels 1 to the separator 2.

Obviously many modifications and variations of the invention, as hereinbefore set forth, may be made without departing from the spirit and scope thereof, and therefore only such limitations should be imposed as are indicated in the appended claims.

I claim:

1. A method of preparing aluminum chloride-hydrocarbon complex which comprises maintaining a stationary mass of solid aluminum chloride in a contact zone, passing a stream consisting essentially of kerosine hydrocarbons in liquid phase through the contact zone in contact with the solid chloride, effecting said contact at a temperature of about 200° F., maintaining the hydrocarbons in the contact zone for not more than about 2 to 3 minutes, effecting solution of a small amount of aluminum chloride in the kerosine hydrocarbons while substantially completely avoiding complex formation, discharging from the contact zone a stream comprising hydrocarbons and dissolved aluminum chloride substantially free from complex, passing the discharged stream to a reaction and settling zone, maintaining said solution therein at a temperature of about 200° F. for a period of about 30 to 60 minutes in the presence of hydrogen halide such that complex formation occurs, effecting phase separation between unreacted hydrocarbons and complex, removing the separated hydrocarbons substantially free from complex, recycling the removed hydrocarbons to the contact zone, and continuing the recirculation of unreacted hydrocarbons to effect substantial conversion of the hydrocarbons to complex.

2. A method of preparing an active metallic halide-hydrocarbon complex liquid catalyst, which comprises maintaining a stationary mass of solid metallic halide in a contact zone, passing a stream consisting essentially of normally liquid non-aromatic hydrocarbon in liquid phase through the contact zone in contact with said solid metallic halide, effecting said contact at elevated temperatures within the range of about 150 to 250° F. while restricting the hydrocarbon to a contact time of about 1 to 5 minutes in said zone to form a solution of the metallic halide in said hydrocarbon without substantial complex formation, passing the resultant stream of hydrocarbon containing dissolved metallic halide, together with added hydrogen halide, into an intermediate portion of an unpacked reaction zone, maintaining the said solution in said latter zone in contact with hydrogen halide at said elevated temperature for at least about 30 minutes under comparatively quiescent conditions, whereby substantially all the metallic halide in solution in said hydrocarbon enters into complex formation with said hydrocarbon and the resulting complex liquid settles to the bottom of said latter zone while a hydrocarbon phase substantially free of complex is formed in an upper portion of said latter zone, withdrawing a stream of active metallic halide-hydrocarbon complex liquid from the lower portion of said latter zone as a final product of the process, withdrawing a stream of the hydrocarbon phase substantially free of complex from an upper portion of said latter zone substantially above the level of the intermediate portion into which the stream of hydrocarbon containing dissolved metallic halide is introduced, and recycling said withdrawn stream of hydrocarbon phase directly through a heater and thence to said contact zone.

GILBERT F. GRUENKE.

REFERENCES CITED

The following references are of record in the file of this patent:

UNITED STATES PATENTS

| Number | Name | Date |
| --- | --- | --- |
| 2,266,012 | d'Ouville et al. | Dec. 16, 1941 |
| 2,220,092 | Evering et al. | Nov. 5, 1940 |
| 1,324,299 | Koetschau | Dec. 16, 1919 |
| 2,308,560 | Carmody et al. | Jan. 19, 1943 |
| 2,342,124 | Danforth | Feb. 22, 1944 |
| 2,301,615 | Chenicek et al. | Nov. 10, 1942 |